(12) United States Patent
Tseng et al.

(10) Patent No.: US 12,736,073 B2
(45) Date of Patent: Sep. 15, 2026

(54) DIRECTIONAL FIXING DEVICE

(71) Applicant: HANWIT PRECISION INDUSTRIES LTD., New Taipei (TW)

(72) Inventors: Ying-Chih Tseng, New Taipei (TW); Ming-De Wu, New Taipei (TW); Ching-Kai Chang, New Taipei (TW)

(73) Assignee: HANWIT PRECISION INDUSTRIES LTD., New Taipei City (TW)

( * ) Notice: Subject to any disclaimer, the term of this patent is extended or adjusted under 35 U.S.C. 154(b) by 304 days.

(21) Appl. No.: 18/428,704

(22) Filed: Jan. 31, 2024

(65) Prior Publication Data

US 2025/0243887 A1 Jul. 31, 2025

(51) Int. Cl.
*F16B 5/06* (2006.01)
*F16B 5/00* (2006.01)

(52) U.S. Cl.
CPC .......... *F16B 5/0642* (2013.01); *F16B 5/0088* (2013.01); *F16B 2005/0671* (2013.01)

(58) Field of Classification Search
CPC .................. F16B 5/0088; F16B 5/0642; F16B 2005/0671; F16B 21/02
See application file for complete search history.

(56) References Cited

U.S. PATENT DOCUMENTS

| | | | | |
|---|---|---|---|---|
| 4,113,221 | A * | 9/1978 | Wehner | A47C 7/004 403/324 |
| 9,091,293 | B1 * | 7/2015 | Tseng | F16B 21/12 |
| 10,132,345 | B2 * | 11/2018 | Wu | F16B 21/02 |
| 2015/0300398 | A1 * | 10/2015 | Tseng | F16B 5/0208 411/91 |
| 2015/0362003 | A1 * | 12/2015 | Tseng | F16B 21/02 411/103 |
| 2024/0011518 | A1 * | 1/2024 | Peng | F16B 5/0642 |

* cited by examiner

*Primary Examiner* — Michael P Ferguson
(74) *Attorney, Agent, or Firm* — MUNCY, GEISSLER, OLDS & LOWE, P.C.

(57) ABSTRACT

A directional fixing device includes a base including a barrel, an annular portion and a channel, a socket set outside the barrel and having a top operation indication structure, a pointing convex portion protruding from the operation indication structure and a lifting structure recessed inside the operation indication structure, the lifting structure being formed from top to bottom with a first positioning groove, a guide ramp and a second positioning groove; a fixing member mounted with an elastic member and having a rod body provided with a through hole at the top and a positioning block at the bottom; and a sliding member fixed through the through hole of the fixing member with one end thereof stopped against the second positioning groove to form positioning.

5 Claims, 8 Drawing Sheets

DIRECTIONAL FIXING DEVICE

BACKGROUND OF THE INVENTION

1. Field of the Invention

The present invention provides a directional fixing device comprising a base, a socket, a fixing member, an elastic member and a sliding member, in particular, a fixing portion of the base is inserted into the fixing hole of a preset first board member to form a fixation, then rotate an operation indication structure of the socket to form an action in which the socket rotates but the base does not move, and drives the sliding member to move along a guide ramp into a first positioning groove or second positioning groove of the socket, so that the positioning block of the fixing member extends into or out of a fixing hole of a preset second board member to form a locking or unlocking action.

2. Description of the Related Art

General panels (board-to-board) are assembled and joined by using positioning screws with knobs, collars and screws to lock, and the screws and collars can be fixed on the first board member. First turn the knob to allow the screw to be locked into the second board member to form a preset position, and then use a hand tool to lock the screw, so that the outer panel, first board member, and the inner panel, second board member, are locked into one. It can be used for board-to-board connection on equipment composed of multiple devices and mechanisms, such as telecommunications office cabinets, industrial computers, work machines or heat dissipation devices.

However, since the various components of the aforementioned devices or equipment are assembled and combined with each other through positioning screws, when the components of these devices or equipment are assembled, the surfaces of the components that are pressed by the heads of the screws often cause damage such as dents, chipping, etc. due to over-tightening of the screws. In order to solve the aforementioned problem of component damage caused by screw locking, some manufacturers also use welding to assemble the components. However, this design will make it difficult to disassemble some components of the industrial product after assembly, thereby making it difficult to repair or replace components.

Based on the various shortcomings of the above-mentioned conventional fixing devices, those in this industry need to develop and improve them.

SUMMARY OF THE INVENTION

Therefore, in view of the above-mentioned problems and deficiencies, the inventor collected relevant information, and after multiple evaluations and considerations, he designed the invention of this directional fixation device.

It is therefore the main object of the present invention to provide a directional fixing device, which comprises a base, a socket, a fixing member, an elastic member and a sliding member. The base comprises a barrel, an annular portion, a fixing portion for positioning a preset first board member, and a channel formed inside. The socket comprises an accommodating cavity set outside the barrel, an operation indication structure formed on the top side thereof, and at least one lifting structure recessed inside the operation indication structure. The operation indication structure is provided with a pointing convex portion protruding toward one side. The lifting structure is formed from top to bottom with at least a first positioning groove, a guide ramp and a second positioning groove located at the hollow side wall of the socket. The fixing member comprises a rod body passed through the channel of the base. The rod body has a top end exposed in the second positioning groove of the socket and provided with a through hole, and an opposing bottom end expanded outward to form a positioning block. The elastic member is sleeved on the outside of the rod body. The sliding member is fixed through the through hole of the fixing member with at least one end thereof stopped against the second positioning groove to form positioning. Rotate the operation indication structure of the socket to form an action in which the socket rotates but the base does not move, and drives the sliding member to move along the guide ramp into the first positioning groove or the second positioning groove, so that the positioning block of the fixing member extends into or out of the fixing hole of the preset second board member to form a locking or unlocking action.

It is another object of the present invention to provide a directional fixing device, wherein the barrel of the base comprises two symmetrical top portions formed a top side thereof. The two top portions are formed with a respective limiting surface on an inner side thereof corresponding to a respective positioning surface on each of two opposite sides of the rod body of the fixing member. The elastic member has one end thereof supported on the top portions of the barrel and an opposite end thereof resisting a resisting portion formed on the top surface of the positioning block of the fixing member. The barrel extends downward to form the annular portion. The annular portion has an upper stop surface for a bottom side of the socket to resist, and an opposing lower stop surface for an upper surface of the preset first board member to contact. The annular portion extends downward to the fixing portion with a relatively smaller diameter and penetrates the fixing hole of the preset first board member. The fixing portion has an anti-rotation cut edge formed on an outer wall thereof to prevent relative rotation between the base and the preset first board member.

It is still another object of the present invention to provide a directional fixing device, wherein the operation indication structure of the socket has a top surface thereof formed with a rotation direction indication and an unlocking graph. The socket is generally pentagonal in plain view, and the pointing convex portion has two opposite side walls thereof recessed to form a plurality of anti-slip grooves.

It is still another object of the present invention to provide a directional fixing device, wherein the number of the at least one lifting structure of the socket is two, and each lifting structure comprises a first limiting wall, the said first positioning groove, the said guide ramp and the said second positioning groove from top to bottom, and the second positioning groove is formed with a vertical second limiting wall on the other side relative to the guide ramp.

It is still another object of the present invention to provide a directional fixing device, wherein the sliding member comprises a rod-shaped shaft portion, and a ratchet-shaped locking portion extending outward from the center of the shaft portion. The sliding member is tightly fixed in the through hole of the fixing member through the ratchet-shaped locking portion.

DETAILED DESCRIPTION OF THE PREFERRED EMBODIMENT

Figure 1:
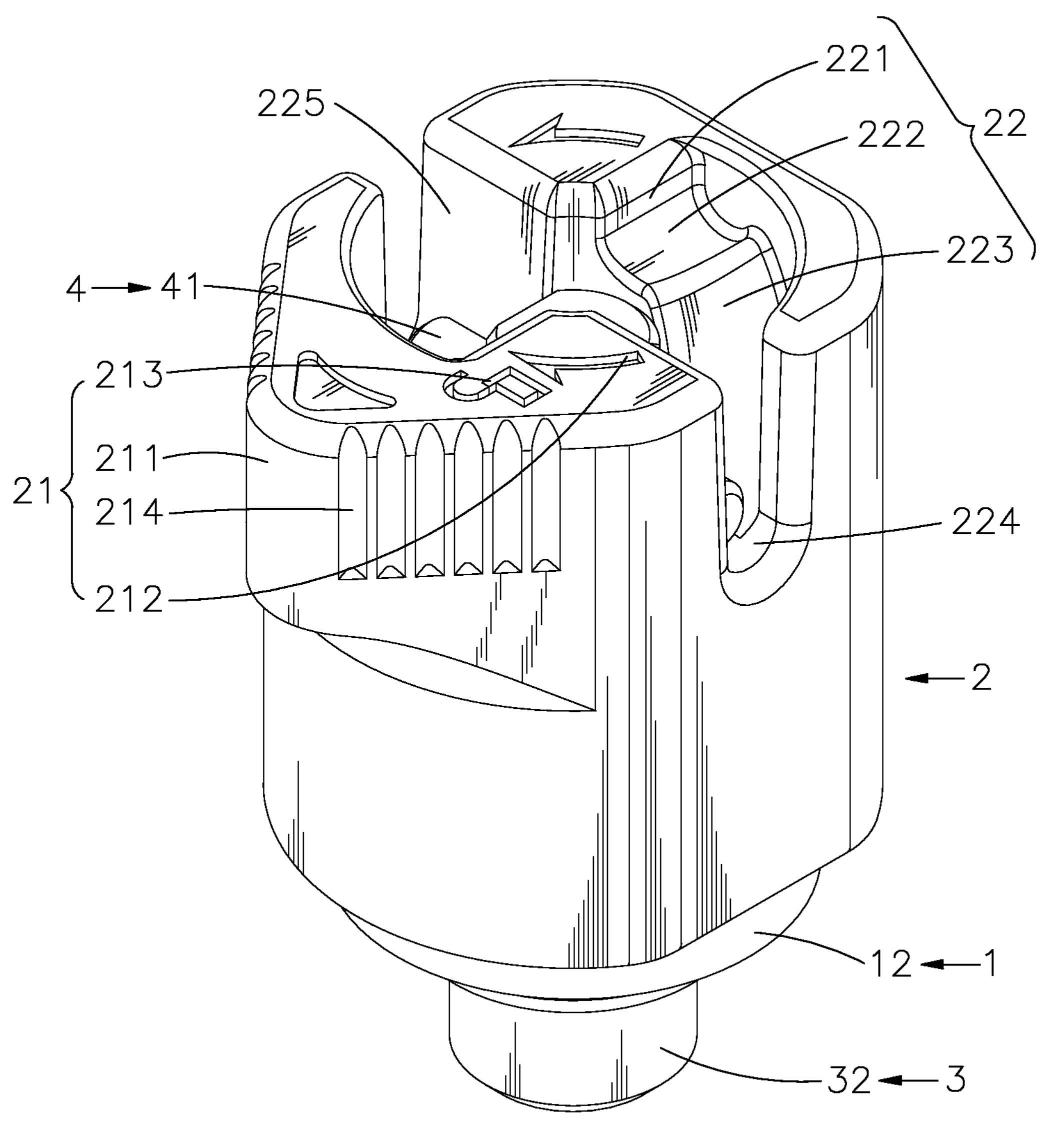
FIG. 1 is a three-dimensional appearance view of the directional fixing device of the present invention.
Figure 2:
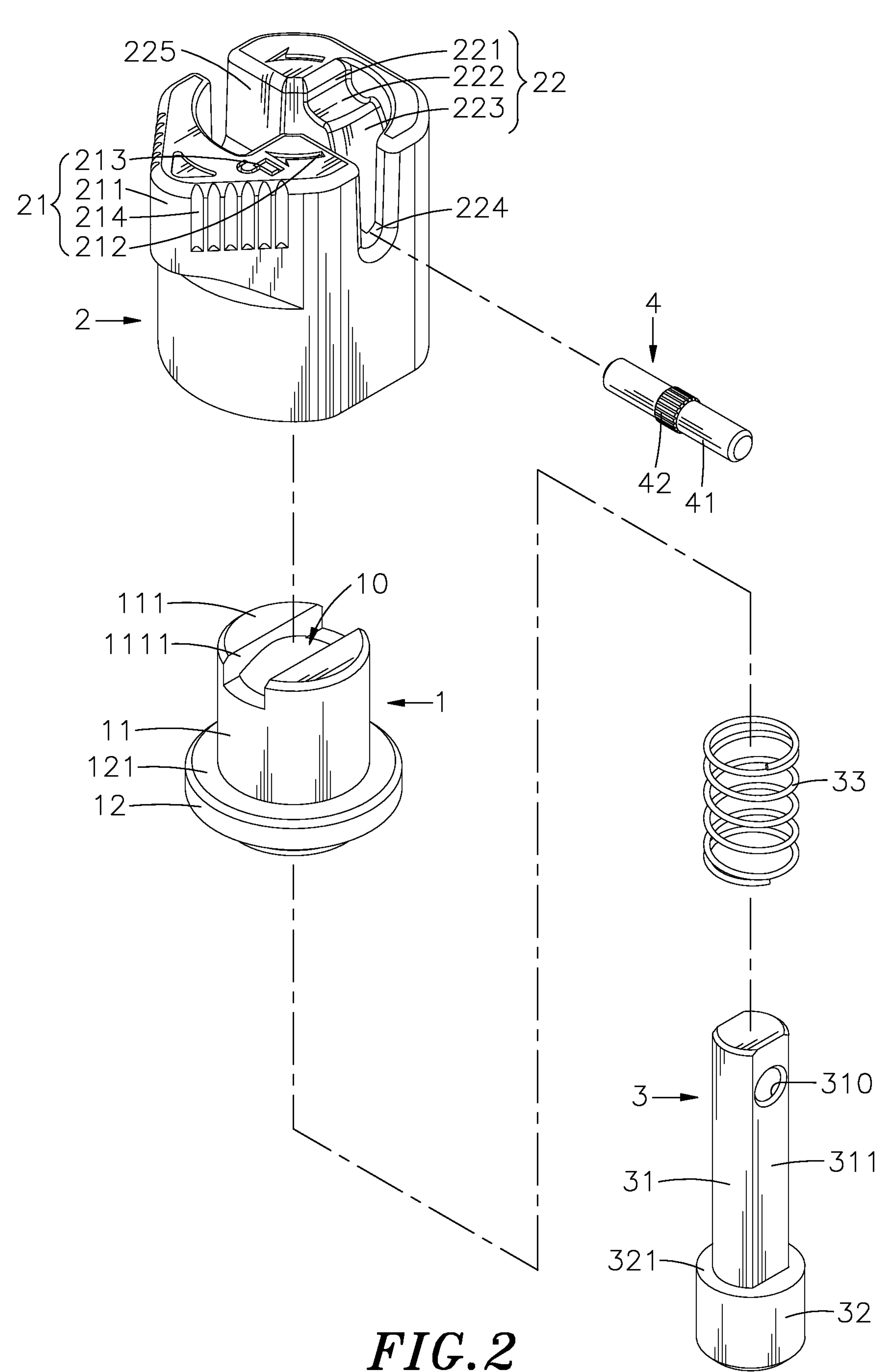
FIG. 2 is a three-dimensional exploded view of the directional fixing device of the present invention.
Figure 3:
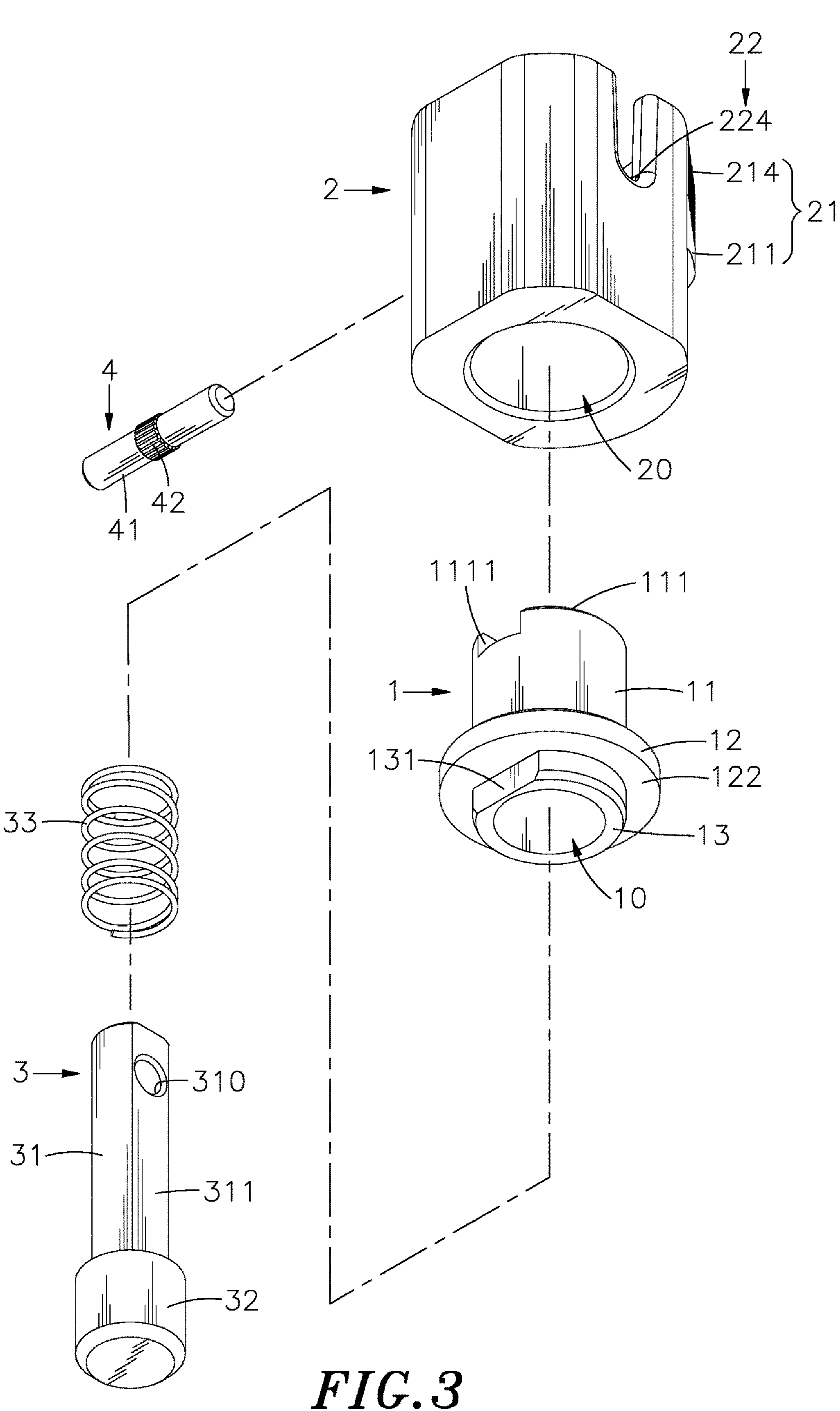
FIG. 3 is another three-dimensional exploded view of the directional fixing device of the present invention.
Figure 4:
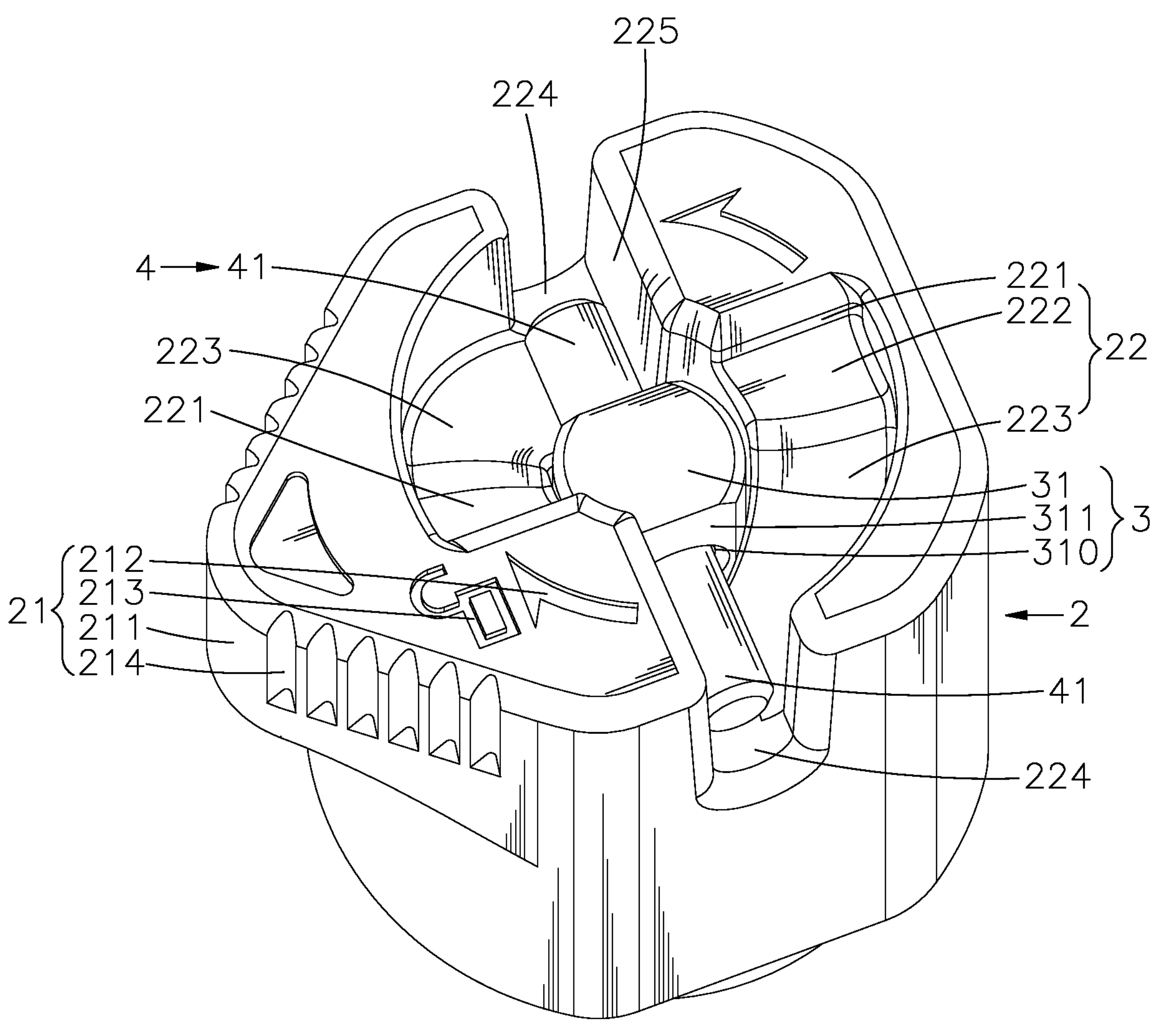
FIG. 4 is another three-dimensional view of the directional fixing device of the present invention.

In order to achieve the above objects and effect, the technical means used in the present invention and its structure, implementation method, etc., the preferred embodiment of the present invention is hereby described in detail and its features and functions are as follows, so as to be fully understood.

Please refer to FIGS. 1, 2, 3, and 4, which are a three-dimensional appearance view of the directional fixing device of the present invention, a three-dimensional exploded view of the directional fixing device of the present invention, another three-dimensional exploded view of the directional fixing device of the present invention, and another three-dimensional view of the directional fixing device of the present invention.

It can be clearly seen from the drawings that the directional fixing device of the present invention mainly comprises a base 1, a socket 2, a fixing member 3, an elastic member 33 and a sliding member 4. All its components and features are detailed as follows:

The base 1 comprises a barrel 11, an annular portion 12, a fixing portion 13 for positioning a preset first board member, and a channel 10 formed inside.

The socket 2 comprises an accommodating cavity 20 set outside the barrel 11, an operation indication structure 21 formed on the top side thereof, and at least one lifting structure 22 recessed inside the operation indication structure 21. The operation indication structure 21 is provided with a pointing convex portion 211 protruding toward one side. The lifting structure 22 is formed from top to bottom with at least a first positioning groove 222, a guide ramp 223 and a second positioning groove 224 located at the hollow side wall of the socket.

The fixing member 3 comprises a rod body 31 passed through the channel 10 of the base 1. The rod body 31 has a top end exposed in the second positioning groove 224 of the socket 2 and provided with a through hole 310, and an opposing bottom end expanded outward to form a positioning block 32. The elastic member 33 is sleeved on the outside of the rod body 31.

The sliding member 4 is fixed through the through hole 310 of the fixing member 3 with at least one end thereof stopped against the second positioning groove 224 to form positioning. Rotate the operation indication structure 21 of the socket 2 to form an action in which the socket 2 rotates but the base 1 does not move, and drives the sliding member 4 to move along the guide ramp 223 into the first positioning groove 222 or the second positioning groove. 224, so that the positioning block 32 of the fixing member 3 extends into or out of the fixing hole 60 of the preset second board member 6 to form a locking or unlocking action.

Two symmetrical top portions 111 are formed above the barrel 11 of the base 1 and are supported by one end of the elastic member 33. The two top portions 111 are formed with limiting surfaces 1111 on opposite inner sides corresponding to the positioning surfaces 311 on both sides of the rod body 31 of the fixing member 3. The other end of the elastic member 33 resists a resisting portion 321 formed on the top surface of the positioning block 32 of the fixing member 3. The barrel 11 extends downward to form the annular portion 12, and the top surface of the annular portion 12 forms an upper stop surface 121 for the bottom side of the socket 2 to resist. The bottom surface of the annular portion 12 forms a lower stop surface 122 for the upper surface of the preset first board member 5 to contact. The annular portion 12 extends downward to the fixing portion 13 with a smaller diameter and penetrates the fixing hole 50 of the preset first board member 5. An anti-rotation cut edge 131 is formed on the outer wall of the fixing portion 13 to prevent relative rotation between the base 1 and the preset first board member 5.

The top surface of the operation indication structure 21 of the socket 2 is further formed with a rotation direction indication 212 and an unlocking graph 213. The socket 2 is generally pentagonal in plan view, and the two side walls of the pointing convex portion 211 are recessed to form a plurality of anti-slip grooves 214.

The preferred embodiment of the above-mentioned at least one lifting structure 22 of the socket 2 is two, and there are two symmetrical first limiting walls 221, the two first positioning grooves 222, the two guide ramps 223 and the second positioning groove 224 from top to bottom. The second positioning groove 224 is formed with a vertical second limiting wall 225 on the other side relative to the guide ramp 223. The first limiting walls 221 can be used as a blocking structure for the sliding member 4 to slide to the first positioning groove 222. The second limiting walls 225 can be used as a blocking structure for the sliding member 4 to slide to the second positioning groove 224.

The sliding member 4 comprises a rod-shaped shaft portion 41, and a ratchet-shaped locking portion 42 extending outward from the center of the shaft portion 41. The sliding member 4 is tightly fixed in the through hole 310 of the fixing member 3 through the locking portion 42.

When assembling the directional fixing device of the present invention, first insert the barrel 11 of base 1 into the accommodating cavity 20 located on the bottom side of socket 2 and form a positioning position, and relative rotation can occur between the base 1 and the socket 2. Then, insert the rod body 31 of the fixing member 3 into the channel 10 of the base 1 to expose the rod body 31 at the second positioning groove 224 of the socket 2, and then insert the sliding member 4 into the through hole 310 of the fixing member 3, so that the locking portion 42 is tightly fixed, and both ends of the rod-shaped shaft portion 41 are pressed against the second positioning groove 224 to form positioning, and the assembly of the directional fixing device is completed through the above.

Figure 5:
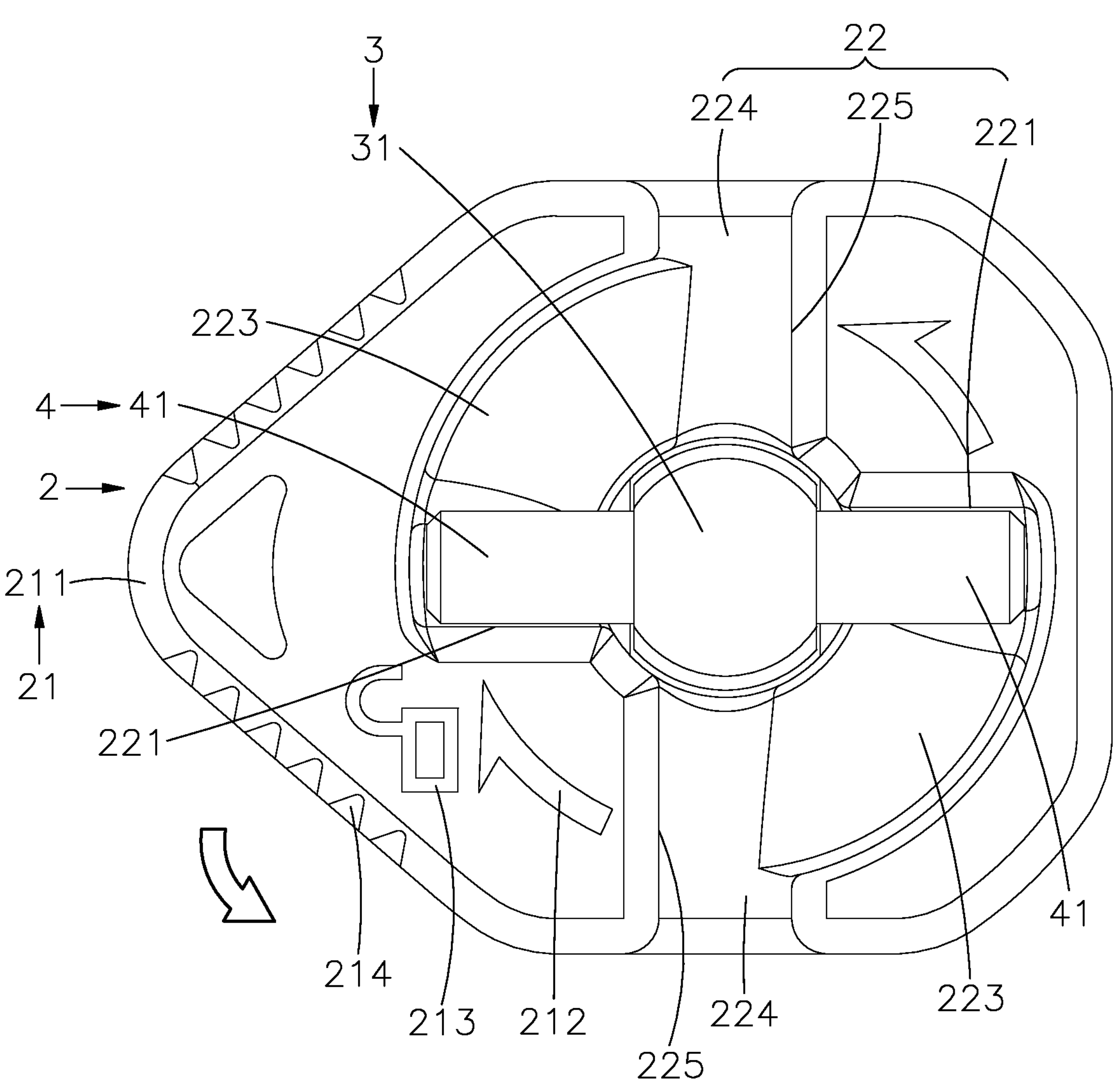
FIG. 5 is a top view of the directional fixing device of the present invention before it is locked with the two board members.
Figure 6:
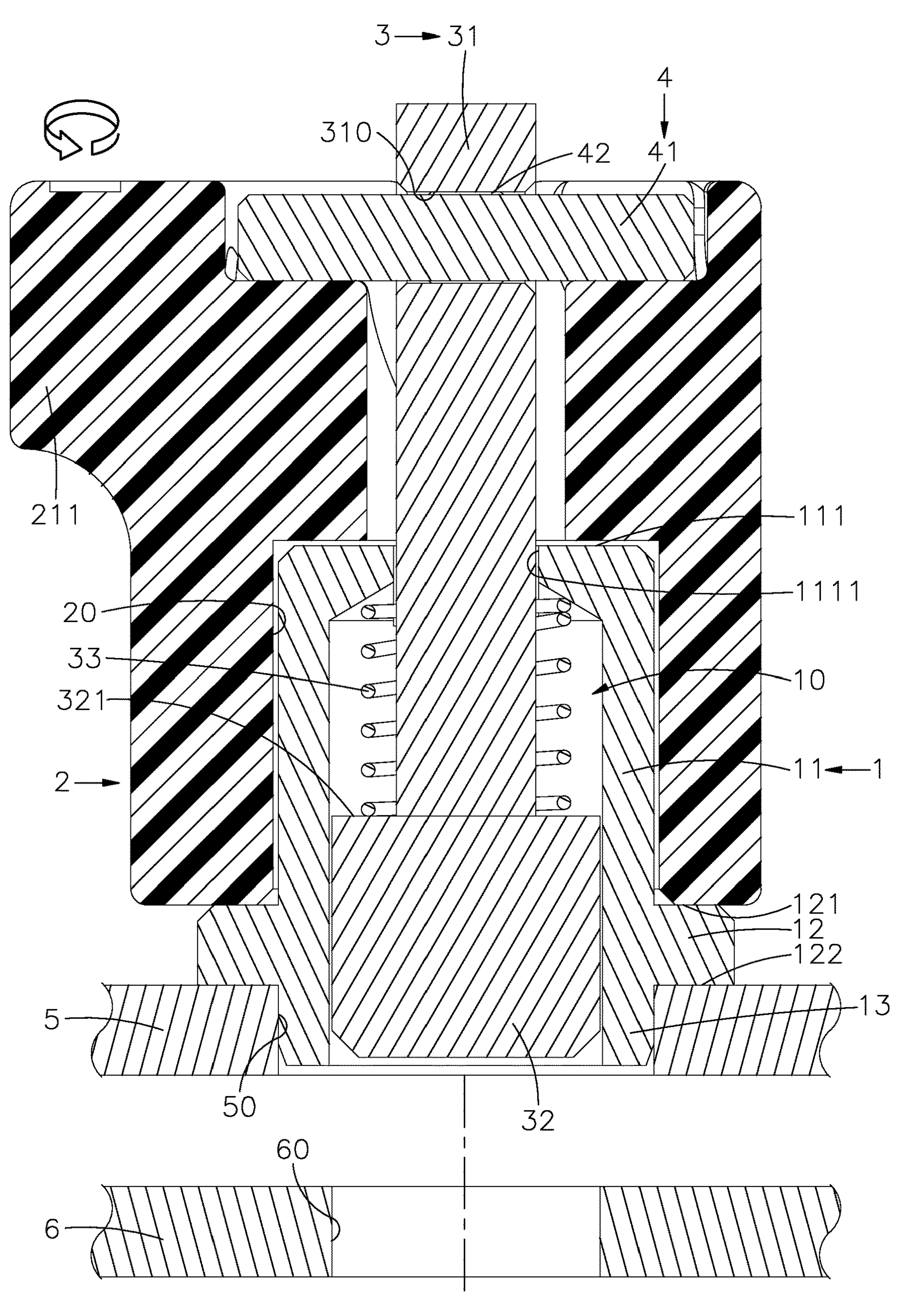
FIG. 6 is a cross-sectional side view of the directional fixing device of the present invention before it is locked with the two board members.
Figure 7:
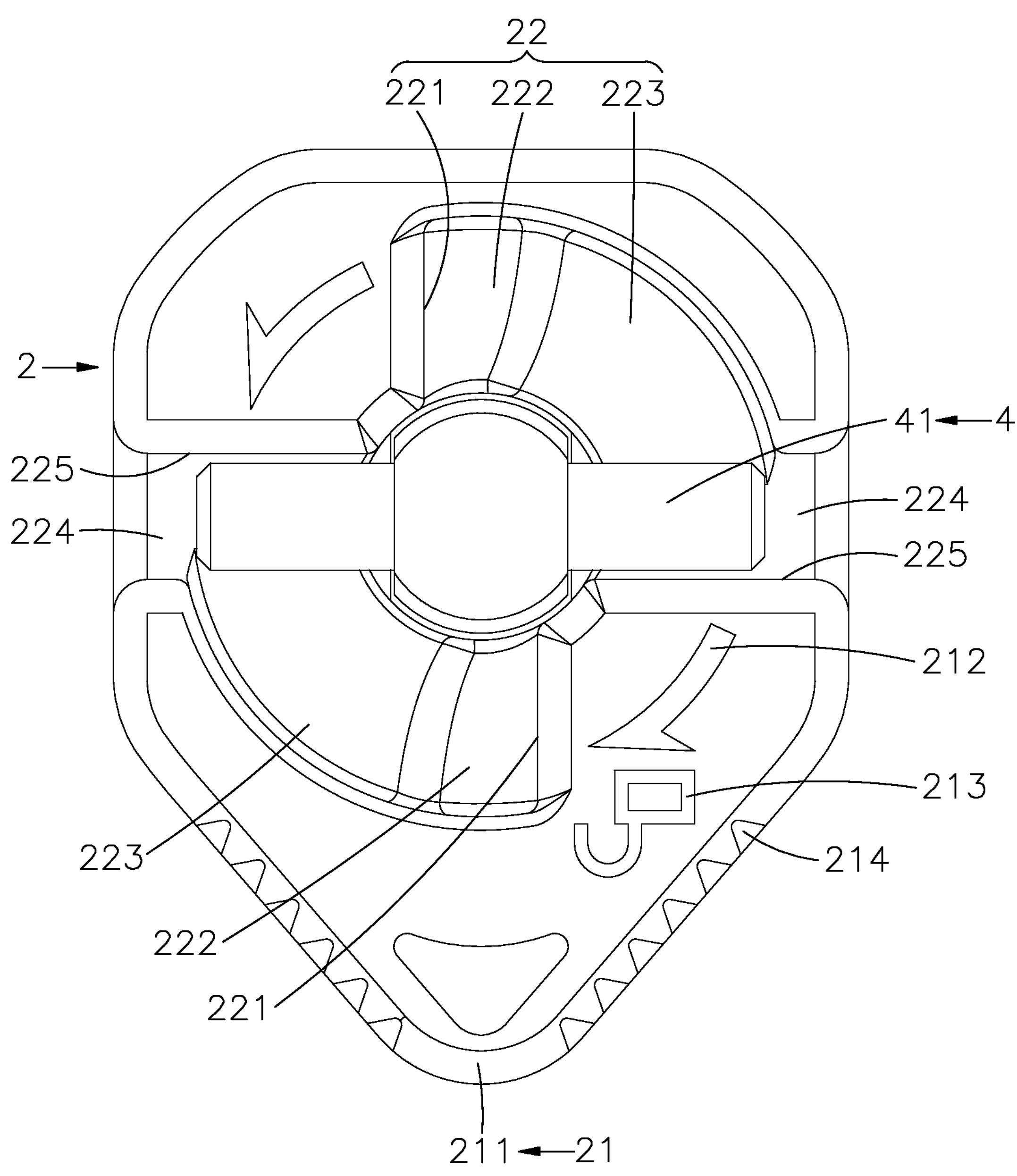
FIG. 7 is a top view of the directional fixing device of the present invention after being locked with the two board members.
Figure 8:
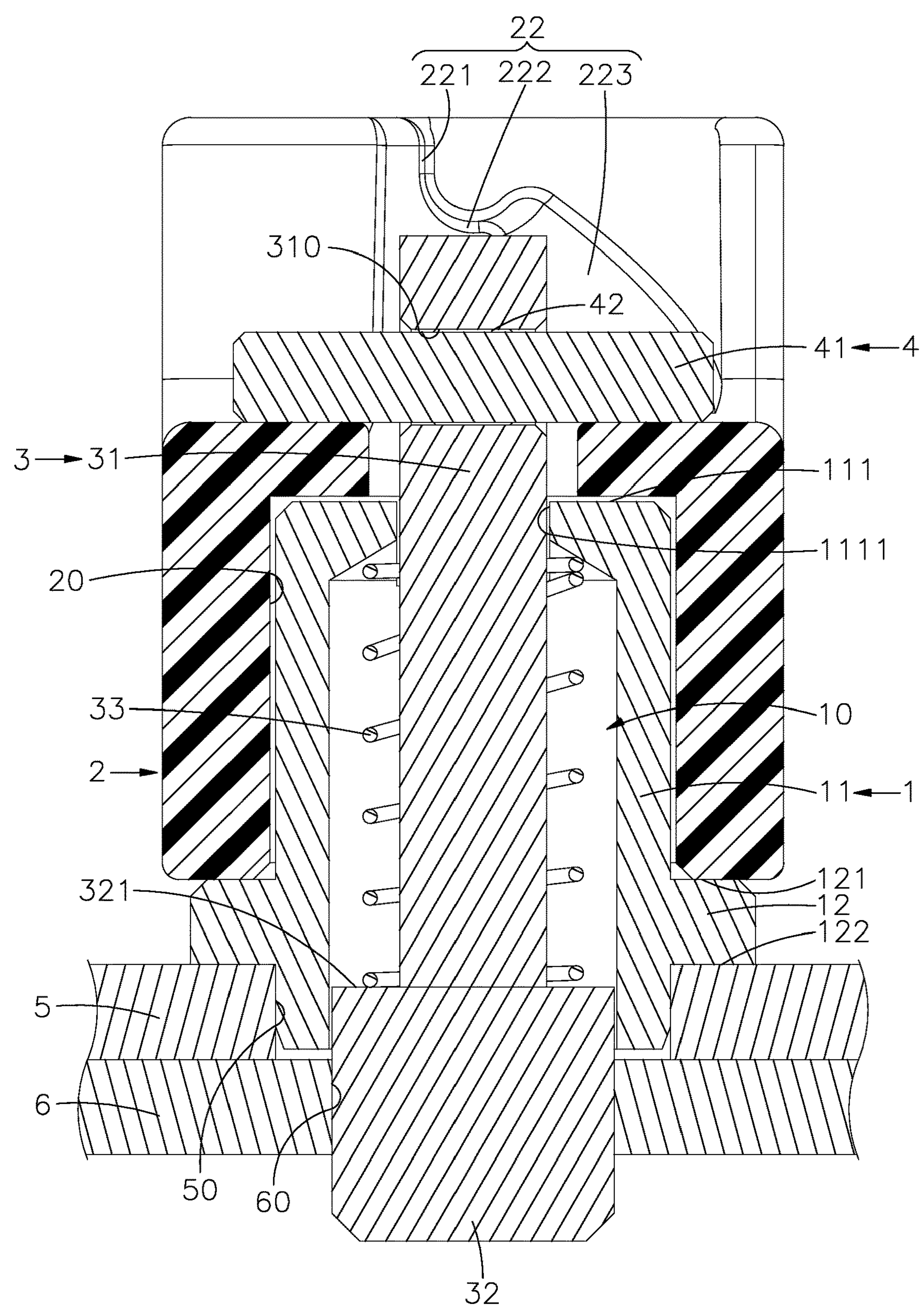
FIG. 8 is a cross-sectional side view of the directional fixing device of the present invention after being locked with the two board members.

Please refer to FIGS. 5 to 8, which are a top view of the directional fixing device of the present invention before it is locked with the two board members, a cross-sectional side view of the directional fixing device of the present invention before it is locked with the two board members, a top view of the directional fixing device of the present invention after being locked with the two board members and a cross-sectional side view of the directional fixing device of the present invention after being locked with the two board members. First, the fixing portion 13 of base 1 is inserted into the fixing hole 50 of first board member 5 to form a tight fixation. The starting position of the sliding member 4 is in the first positioning groove 222 of the socket 2, and when viewed from a bird's eye view, the sliding member 4 is parallel to the pointing convex portion 211 of the socket 2 (as shown in FIG. 5, but we do not limit ourselves to this), the positioning block 32 of the fixing member 3 located below the sliding member 4 is completely contained in the channel 10 of the base 1, and at the same time, the elastic member 33 located outside the rod body 31 is in a compressed state (as shown in FIG. 6). When you want to perform the fixed movement of the first board member 5 and the second board member 6, you need to hold the operation indication structure 21 to rotate the socket 2 but the base 1 does not move, so as to drive the sliding member 4 to move downward along the guide ramp 223 from the first positioning groove 222 to the second positioning groove 224. Since the limiting surfaces 1111 of the base 1 resist the positioning surfaces 311 of the fixing member 3, fixing member 3 will not rotate along with the sliding member 4. Viewed from a bird's eye view from the sliding member 4, it is perpendicular to the pointing convex portion 211 of the socket 2 (as shown in FIG. 7, but we are not limited to this). The positioning block 32 of the fixing member 3 located below the sliding member 4 extends downward outside the base 1, so that the positioning block 32 of the fixing member 3 extends into the fixing hole 60 of the second board member 6 to form a locking action. At the same time, the elastic member 33 located outside the rod body 31 is in an extended state (as shown in FIG. 8), and the locking action of the first board member 5 and the second board member 6 is completed through the above.

When you want to unlock the first board member 5 and the second board member 6, you only need to hold the operation indication structure 21 to rotate the socket 2 but the base 1 does not move, so as to drive the sliding member 4 to move upward from the second positioning groove 224 along the guide ramp 223 to the first positioning groove 222. At this time, sliding member 4 turns from the position perpendicular to the pointing convex portion 211 of the socket 2 to the position parallel to the pointing convex portion 211 of the socket 2, the positioning block 32 of the fixing member 3 retracts from the fixing hole 60 of the second board member 6 into the channel 10 of the base 1, and at the same time, the elastic member 33 located outside the rod body 31 changes from the extended state to the compressed state. Through the above, the unlocking and separation actions of the first board member 5 and the second board member 6 are completed. Through the alignment relationship between the sliding member 4 and the pointing convex portion 211 of the socket 2, the present invention allows the operator to quickly identify whether the directional fixing device is in a locked or unlocked state, which is helpful for quickly locking or disassembling a large number of two board members.

The above is only a preferred embodiment of the present invention, and does not limit the patent scope of the present invention. Therefore, all simple modifications and equivalent structural changes made by using the description and drawings of the present invention shall be included in the patent scope of the present invention and shall be clearly stated.

To sum up, the directional fixing device of the present invention can indeed achieve its function and purpose when used. Therefore, the present invention is indeed an invention with excellent practicability. In order to meet the requirements for the application of new patents, an application is filed in accordance with the law. I hope that the review committee will approve this case as soon as possible to protect the hard work of the inventor. If the review committee has any doubts, please feel free to send us a letter to instruct, and the inventor will do his best to cooperate.

What the invention claimed is:

1. A directional fixing device, comprising:

a base, said base comprising a barrel, an annular portion, a fixing portion for positioning a preset first board member, and a channel formed inside;

a socket comprising an accommodating cavity set outside said barrel, an operation indication structure formed on a top side thereof, a pointing convex portion protruding from said operation indication structure toward one side and at least one lifting structure recessed inside said operation indication structure, said lifting structure being formed from top to bottom with at least a first positioning groove, a guide ramp and a second positioning groove located at a hollow side wall of said socket;

a fixing member comprising a rod body passed through said channel of said base, said rod body having a top end thereof exposed in said second positioning groove of said socket and provided with a through hole and an opposing bottom end thereof expanded outward to form a positioning block;

an elastic member sleeved on the outside of said rod body; and a sliding member fixed through said through hole of said fixing member with at least one end thereof stopped against said second positioning groove in a movable, repositionable manner to form an extended locking position of the fixing member;

wherein rotating said operation indication structure of said socket to form an action in which said socket rotates but said base is immovable, and drives said sliding member to move along said guide ramp into said first positioning groove or said second positioning groove, so that said positioning block of said fixing member extends into or out of a fixing hole of a preset second board member to form a locking or unlocking action.

2. The directional fixing device as claimed in claim 1, wherein said barrel of said base comprises two symmetrical top portions formed on a top side thereof, said two top portions being formed with a respective limiting surface on an inner side thereof corresponding to a respective positioning surface on each of two opposite sides of said rod body of said fixing member; said elastic member has one end thereof supported on said top portions of said barrel and an opposite end thereof resisting a resisting portion formed on a top surface of said positioning block of said fixing member; said barrel extends downward to form said annular portion, said annular portion having an upper stop surface for a bottom side of said socket to resist and an opposing lower stop surface for an upper surface of said preset first board member to contact; said annular portion extends downward to said fixing portion with a relatively smaller diameter and penetrates a fixing hole of said preset first board member; said fixing portion has an anti-rotation cut edge formed on an outer wall thereof to prevent relative rotation between said base and said preset first board member.

3. The directional fixing device as claimed in claim 1, wherein said operation indication structure of said socket has a top surface thereof formed with a rotation direction indication and an unlocking graph; said socket is generally pentagonal in plain view, and said pointing convex portion has two opposite side walls thereof recessed to form a plurality of anti-slip grooves.

4. The directional fixing device as claimed in claim 1, wherein the number of said at least one lifting structure of said socket is two, and each said lifting structure comprises a first limiting wall, one of said two first positioning grooves, one of said two guide ramps and one of said two second positioning grooves from top to bottom, and said second positioning groove is formed with a vertical second limiting wall on the other side relative to said guide ramp.

5. The directional fixing device as claimed in claim 1, wherein said sliding member comprises a rod-shaped shaft portion and a ratchet-shaped locking portion extending outward from a center of said shaft portion, said sliding member being tightly fixed in said through hole of said fixing member through said ratchet-shaped locking portion.

* * * * *